United States Patent [19]

Suzuki et al.

[11] Patent Number: 5,388,869
[45] Date of Patent: Feb. 14, 1995

[54] SADDLE TYPE PLASTIC PIPE JOINT

[75] Inventors: Shoji Suzuki, Yokohama; Tsuneo Aoi; Satoshi Okada, both of Hiratsuka, all of Japan

[73] Assignee: Nippon Zeon Co., Ltd., Tokyo, Japan

[21] Appl. No.: 41,593

[22] Filed: Apr. 5, 1993

[51] Int. Cl.[6] .......................................... F16L 41/08
[52] U.S. Cl. .................................. 285/197; 285/381; 285/915; 156/296
[58] Field of Search ............... 285/197, 381, 909, 915; 156/294

[56] References Cited

U.S. PATENT DOCUMENTS

| | | | |
|---|---|---|---|
| 3,982,564 | 9/1976 | Clabburn et al. | 285/381 X |
| 4,624,487 | 11/1986 | Thalmann | 285/197 |
| 4,655,480 | 4/1987 | Thalmann | 285/197 X |
| 4,732,412 | 3/1988 | Linden et al. | 285/915 X |

*Primary Examiner*—Dave W. Arola
*Attorney, Agent, or Firm*—Armstrong, Westerman, Hattori, McLeland & Naughton

[57] ABSTRACT

A saddle type pipe joint for construction of branching connections, composed of a saddle-shaped main pipe-connecting part and a cylindrical branching pipe-connecting part. The two parts are integrally molded by a reaction molding, composed of a shape-memorized plastic resin, and have on the inner surfaces a fusion-bonding plastic resin layer containing a conductive filler. The pipe joint is made by polymerising a reactive liquid stock for a shape-memorizable plastic resin in a mold using a core made of a fusible plastic resin containing a conductive filler; cutting the main pipe part of the molded composite article along its length at the side opposite to the branching pipe-connecting site; and opening side edges of the thus-cut main pipe. The construction of branching connections is carried out by utilizing the restoration of the shape-memorized plastic resin to the original shape.

8 Claims, 5 Drawing Sheets

SADDLE TYPE PLASTIC PIPE JOINT

BACKGROUND OF THE INVENTION

1. Field of the Invention

This invention relates to a pipe joint, a method of making the pipe joint, and a method of constructing a branching connection. More specifically, this invention relates to a saddle type plastic pipe joint used for connecting a branching plastic pipe to a main plastic pipe, a method of making the saddle type pipe joint and a method of connecting a branching plastic pipe to a main plastic pipe by utilizing a shape-memorizing function of the pipe joint.

2. Description of the Related Art

In recent years, plastic pipes such as polyolefin pipes, for example, a polyethylene pipe are often used in substitution for metal pipes as water lines, hot water supply pipes and hot spring-conducting pipes. Polyolefin pipes have advantages, compared with metal pipes, such that they are light in weight and easy to handle and have good corrosion resistance and chemical resistance, a scale is not readily deposited thereon, and they are of a large length and thus the number of joints can be decreased.

In a pipe arrangement composed of plastic pipes, branching joints are indispensable for the construction of branching connections where pipes branch from midway locations of the length of a main pipe. As means for the construction of branching connections, a saddle type joint having embedded therein an electrically conductive wire as a heating element is used. The saddle type joint has a structure such that a circular opening is formed in the location of the main body where a branching pipe is connected to the main pipe, and the electrically conductive wire is wound in a spiral configuration around the opening. The saddle type joint has a saddle portion which covers approximately a half of the entire periphery of the main pipe (for example, see U.S. Pat. Nos. 4,455,482 and 4,894,521). The pipe joint of this type which has a spirally configured electrically conductive wire requires much labor to make the joint, and a special device or cool (for example, as illustrated in FIG. 12 of U.S. Pat. No. 4,452,482) is necessary for fitting the saddle-shaped part of the joint to the main pipe. If the saddle-shaped part is fitted to the main pipe by welding without use of the special device or tool, where the main pipe has a distortion even though only to a minor extent, gaps are left between the inner surface of the pipe joint and the outer surface of the main pipe with the result that a good fusion-bonding cannot be obtained.

A pipe joint having a heat-generating plastic element has also been proposed, which element has incorporated therein an electrically conductive filler instead of the electrically conductive wires. For example, in European Patent 157,640, a heat-recoverable pipe joint is disclosed which has a heat-recoverable element composed of a heat-generating polyethylene layer having incorporated therein a conductive filler and a crosslinked polyethylene layer formed on the heat-generating polyethylene layer. As an example of the application of the heat-recoverable pipe joint, a construction of a branching connection wherein a pipe branches from a main pipe (see FIGS. 5 and 6). This branching connection is achieved by a method wherein a hole is previously bored in the main pipe, and a pipe is inserted into the hole to construct a branched pipe. Therefore, the branching connection cannot be constructed while a liquid is allowed to flow through the installed main pipe. Further, although a special device or tool as described in U.S. Pat. No. 4,452,482 is not necessary in the heat-recoverable pipe joint, the joint is not firmly bound to the main pipe because the crosslinked polyethylene surface layer is relatively thin.

Recently, an electrofusion pipe joint has been proposed which comprises a base body composed of a thermosetting polynorbornene resin and molded by a reaction molding, and a heat-generating member composed of a plastic having incorporated therein an electrically conductive filler (see Japanese Unexamined Patent Publication No. H4-294115). In this publication, pipe joints of a complicated or special shape such as elbow-type and cheese-type joints, as well as a simple pipe-type joint, are described. These joints of a complicated or special shape are made by a process wherein a hollow plastic article having not incorporated therein an electrically conductive filler is blow-molded, a heat-generating element is fitted to a desired site of the hollow article, and then, a norbornene monomer is cast and polymerized in a mold where the heat-generating element-fitted hollow article has been placed as a core. However, this process cannot be employed for making non-hollow pipe joints such as a saddle-type pipe joint. Further, the heat-generating element having a hole in the connection site as described in the abovementioned U.S. Pat No. 4,455,482 is difficult to make by injection-molding a plastic material having incorporated therein an electrically conductive filler because the filler-incorporated plastic material has a poor melt-flowability and further a complicated mold having fitted thereto a combination of a plurality of cores is necessary.

If the saddle-shaped part of a saddle type pipe joint which is fusion-bonded to a main pipe is made from a plastic material having not incorporated therein an electrically conductive filler, and a heat-generating element having an electrically conductive filler is fitted onto the saddle-shaped part, then a heat-generating element of a special shape which has a hole at the site of a pipe-branching connection must be used, and further, the fusion-bonding of the saddle-shaped part to the main pipe is not satisfactory in the peripheral area of the branching pipe-connected part because the conductive filler is not present at the site of branching connection.

SUMMARY OF THE INVENTION

In view of the foregoing, a primary object of the invention is to provide a saddle type plastic pipe joint which can be easily fitted to an installed main plastic pipe, has a good watertightness, and can be made without difficulty.

Another object of the invention is to provide a process for making the saddle type pipe joint industrially advantageously, and a method of constructing branching connections.

In one aspect of the present invention, there is provided a saddle type pipe joint for construction of branching connections, which comprises a saddle-shaped part to be fusion-bonded to a main pipe and a cylindrical branching pipe-connecting part to which a branching pipe is connected, said saddle-shaped part and said cylindrical branching pipe-connecting part being integrally molded together by a reaction molding and composed of a shapememorized plastic resin; said saddle-shaped part fitting over the main pipe and having a peripheral length larger than a half of the outer periphery of the main pipe, and having memorized therein a shape such that the saddle-shaped part tightly holds the main pipe in the state of closely contacting with at least half of the outer periphery of the main pipe; said saddle-shaped part having on the inside thereof a fusion-bonding plastic resin layer which is fused and bonded to the main pipe at a temperature at which the saddle-shaped part is restored to the memorized original shape, said fusion-bonding plastic layer comprising a fusible plastic resin layer having incorporated therein an electrically conductive filler or comprising a laminate of a fusible plastic resin layer having not incorporated therein an electrically conductive filler and a fusible plastic resin layer having incorporated therein an electrically conductive filler.

In a preferred embodiment of the saddle type pipe joint of the invention, one end portion of the cylindrical branching pipe-connecting part of the joint has an enlarged diameter so that a branching pipe can easily be inserted and said end portion has memorized therein a cylindrical shape having a diameter equal to or smaller than the outer diameter of the branching pipe; and said diameter-enlarged end portion having on the inside thereof an integrally formed fusible plastic resin layer which is fusion-bonded to the outer surface of the branching pipe at a temperature at which said diameter-enlarged end portion is restored to the memorized original shape. This fusible plastic resin layer may or may not contain an electrically conductive filler.

In another aspect of the invention, there is provided a process for making a saddle type pipe joint, which comprises the step of:

preparing a core assembly composed of (1) a core for forming a saddle-shaped part of the pipe joint, which is a pipe core made of a fusible plastic resin having incorporated therein an electrically conductive filler or a double-layered composite pipe core having an outer layer of a fusible plastic resin having incorporated therein an electrically conductive filler and an inner layer of a fusible plastic resin having not incorporated therein an electrically conductive filler, and (2) a core for forming a branching pipe-connecting part of the pipe joint;

placing the core assembly in a mold;

charging a cavity formed between the inner surface of the mold and the core assembly, with a reactive liquid stock for forming a shape-memorizable plastic resin layer, and polymerizing the charged reactive liquid stock to form a composite article composed of a shape-memorizable plastic resin layer and the core assembly which is integrated with the shape-memorizable plastic resin layer;

cutting the main pipe part of the composite article along the length of the main pipe part at the side opposite to the branching pipe-connecting site; and opening both side edges of the thus-cut main pipe part at an elevated temperature to render it saddle-shaped.

In still another aspect of the invention, there is provided a method of constructing a branching connection which comprises the steps of:

allowing the saddle-shaped main part of the above-mentioned saddle type pipe joint to sit astride a main plastic pipe, said saddle-shaped main part having an inner heat-fusible plastic resin layer;

heating the saddle-shaped main part whereby the saddle-shaped main part is restored to the memorized original shape and simultaneously the inner heat-fusible plastic resin layer is fusion-bonded to the main plastic pipe;

boring a hole in the saddle-shaped main part at the site where the cylindrical branching pipe-connecting part is integrally connected with the main part; and then, inserting a branching pipe into the cylindrical part of the pipe joint; and connecting the branching pipe to the cylindrical part of the pipe joint.

DESCRIPTION OF THE PREFERRED EMBODIMENTS

The construction of branching connections, i.e., the connection of branching pipes to a main pipe, using the saddle type pipe joint of the invention is achieved by utilizing a shape-memorizable plastic resin. When a shape-memorizable plastic article having a predetermined shape preliminarily shaped in a mold by polymerization of a plastic resin-forming monomer is post-formed into another predetermined shape at an elevated temperature equal to or higher than the glass transition temperature (Tg) of the plastic resin, and the post-formed plastic article is cooled while the shape is kept as it is, the original shape of the plastic article is memorized. When the post-formed plastic article is heated to an original shape-restoring temperature, which is usually equal to or higher than the glass transition temperature (Tg), the plastic article is restored to the memorized original shape.

In the preparation of the saddle type pipe joint of the invention, an original shape which is closely fitted to the outer periphery of a main pipe is first given to the main part of the pipe joint which is to be placed in contact with the main pipe, and thereafter, the main part of the pipe joint is post-formed into a saddle shape at an elevated temperature so that the joint is capable of sitting astride the main pipe. When the saddle-shaped part is allowed to sit astride the main pipe and is heated to a predetermined temperature, the saddle-shaped part is restored to the original shape so that the saddle-shaped part is closely contacted with and firmly holds the main pipe. Since the saddle-shaped part of the joint has a heat-fusible plastic resin layer on the inner surface thereof, which is fusible at the original shape-restoring temperature, when the saddle part is heated for restoration to the original shape, the saddle portion is fusion-bonded to the main pipe.

Thereafter, a hole is bored on the main pipe by inserting a hole-boring tool into the cylindrical branching pipe-connecting part of the pipe joint, and a branching pipe is connected to the cylindrical part of the pipe joint by s suitable means thereby to complete the construction of branching connection. There is no need of cutting the main pipe at the construction of branching connection, and therefore, the construction work is simple and can be effected in situ.

A shape-memorizable plastic resin can also be utilized for the branching pipe-connecting part of the pipe joint. Namely, the cylindrical part of the pipe joint into which a branching pipe is inserted is first prepared so that the branching pipe-connecting portion of the cylindrical part has an inner diameter equal to or slightly smaller than the outer diameter of the branching pipe. The branching pipe-connecting portion is heated and the inner diameter thereof is enlarged to a size at which a branching pipe is easily inserted into this portion. Then the branching pipe is inserted into the diameter-enlarged portion of the cylindrical part and heated to the original shape-restoring temperature whereby the diameter-enlarged portion is restored to the original size and the cylindrical part of the joint is closely contacted with and firmly holds the branching pipe. Simultaneously, a heat-fusible plastic resin layer formed on the inner surface of the branching pipe-connecting portion of the cylindrical part is fused and the branching pipe-connecting portion is fusion-bonded to the branching pipe.

Figure 1:
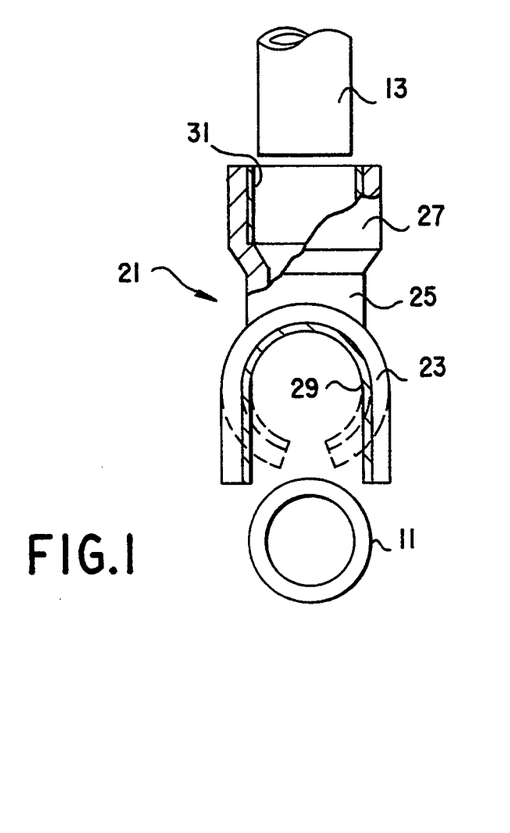
FIG. 1 is a partially cut-open front view of a saddle type pipe joint of the invention.
Figure 2:
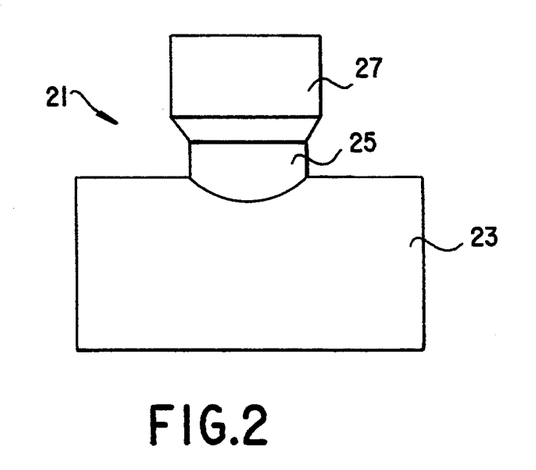
FIG. 2 is a side view of the saddle type pipe joint shown in FIG. 1.

Non-limiting embodiments of the invention will now be described by way of example with reference to the accompanying drawings. In FIGS. 1 and 2 which illustrate one example of the saddle type pipe joint of the invention, the pipe joint 21 is composed of a saddle-shaped part 23 to be fusion-bonded to a main plastic pipe 11 made of, for example, a polyolefin, and a cyrindrical part 25 to which a branching pipe 13 is connected. The saddle-shaped part 23 and the cylindrical part 25 are integrally molded together and composed of a shape-memorized plastic resin. The saddle-shaped part 23 and the cylindrical part 25 have heat-fusible plastic resin layers 29 and 31, respectively, on the inner surfaces of the saddle-shaped part and the cylindrical part.

As specific examples of shape-memorizable plastic resins used for making the saddle type pipe joint, there can be mentioned polynorbornenes (i.e., polymers prepared by a ring opening polymerization of norbornene monomers), polyesters, polyurethanes, epoxy resins and polyamides. Of these, thermosetting polynorbornenes are preferable because a polymer the same as or analogous to a polyolefin pipe can be used as a heat-fusible plastic resin layer; the thermosetting polynorbornenes have a high glass transition temperature (Tg); and a thermosetting polynorbornene of a desired Tg can easily be selected.

The periphral length of the saddle-shaped part 23, i.e., the U-shaped length spanning from one side edge to the other side edge, is larger than a half of the outer periphery of the main pipe 11. The saddle-shaped part 23 has a shape such that it fits over the main pipe in the state of sitting astride the main pipe. A shape shown by a broken line in FIG. 1 is memorized in the saddle-shaped part 23, and therefore, when the saddle-shaped part 23 is heated and restored to the memorized original shape, the entire inner surface of the saddle-shaped part 23 is closely contacted with the outer periphery of the main pipe 11 so that the saddle-shaped part 23 firmly holds the main pipe 11. The peripheral length of the saddle-shaped part is preferably at least 70%, more preferably at least 75%, of the outer periphery of the main pipe 11. The maximum length of the saddle-shaped part 23 is not particularly limited provided that side edge portions of the saddle-shaped part do not overlap with each other, but is usually shorter than 95% of the outer periphery of the main pipe 11. A saddle-shaped part, which is made by outting along the length of a pipe having an inner diameter which is the same as the outer diameter of the main pipe, can also be used.

The saddle type pipe joint of the invention is made as follows. First, a T-shaped core assembly is prepared by combining (1) a core for forming a saddle-shaped main part, which is a pipe core made of a fusible plastic resin, with (2) a core for forming a branching pipe-connecting part, such as a columnar metal rod or a pipe made of a fusible plastic resin. When a columnar metal rod is used as a core for forming a branching pipe-connecting part, a cylindrical heat-fusible plastic resin element is preferably fitted on the periphery of at least one end portion of the columnar rod core, which plastic resin forms the fusible plastic resin layer 31 (FIG. 1). It is preferable that the pipe core and the columnar rod core are combined into a T-shape in a manner such that a reactive liquid stock for forming a shape-memorizable plastic resin does not intrude or intrude only to a minor extent into the connected portion of the pipe core and the columnar rod core in a mold.

The pipe core and the cylindrical element fitted on an end portion of the columnar rod core are made of a fusible plastic resin having incorporated therein an electrically conductive filler such as carbon black, or are of a double-layered composite structure having a layer of a fusible plastic resin having incorporated therein an electrically conductive filler and a layer of a fusible plastic resin having not incorporated therein an electrically conductive filler. The double-layered composite structure can be made by a known procedure, for example, by a procedure described in Japanese Unexamined Patent Publication No. 4-294115. The fusible plastic resin layer having incorporated therein an electrically conductive filler has a fusible function and a heat-generating function.

Alternatively, a pipe core can be used instead of the columnar rod core for forming the branching pipe-connecting part. The pipe core is made of a fusible plastic resin having incorporated therein an electrically conductive filler or is of a double-layered composite structure having a layer of a fusible plastic resin having incorporated therein an electrically conductive filler and a layer of a fusible plastic resin having not incorporated therein an electrically conductive filler. Where the pipe core is used for forming the branching pipe-connecting part, the T-shaped core assembly must be made in a manner such that a reactive liquid stock for forming a shape-memorizable plastic resin does not intrude into the inside of the connected portion of the two core pipes.

The use of pipe cores made of a fusible plastic resin layer is advantageous in that the two pipe cores for the saddle-shaped main part and for the branching pipe-connecting part can be made separately and economically, and that, since the fusible plastic resin layer is formed on the entire inner surface of the saddle-shaped main part including the area wherein the saddle-shaped main part is connected to the branching pipe-connecting part, the pipe joint is firmly fusion-bonded to a main pipe and a branching pipe.

The T-shaped core assembly is placed in a mold. The cavity formed between the inner surface of the mold and the core assembly is charged with a reactive liquid stock for forming a shape-memorizable plastic resin, and the reactive liquid stock is polymerized in the mold, i.e., is reaction-molded to form a T-shaped composite article composed of a shape-memorizable plastic resin layer and the core assembly which is integrated with the shape-memorizable plastic resin layer.

If a columnar rod core such as a columnar metal rod is used as the core for forming the branching pipe-connecting part, the columnar rod core is removed from the molded T-shaped composite article while the cylindrical fusible plastic resin layer 31 is left on the inner surface of the end portion 27 of the cylindrical branching pipe-connecting part.

After or before the removal of the columnar rod core from the molded T-shaped composite article, the main pipe part of the composite article is out along the length of the main pipe part at the side opposite to the branching pipe-connecting site. Thus, a T-shaped composite article having a main pipe part which is cut as illustrated by a broken line in FIG. 1 is obtained. The cut width (i.e., the opening width of the cut main pipe part illustrated by a broken line in FIG. 1) is selected so that the peripheral length of the main pipe part is larger than a half of the outer periphery of the main pipe 11.

Side edge portions of the cut main pipe part are opened at an elevated temperature whereby the cut main pipe part 23 becomes a saddle-shape as illustrated by a solid line in FIG. 1. The temperature at which the cut main pipe part is opened is usually equal to or higher than the glass transition temperature (Tg). The composite article is then cooled while the shape is maintained as it is. Thus, the original shape (illustrated by a broken line in FIG. 1) is memorized in the saddle shape part. If the cooled saddle-shaped composite article is again heated to a temperature equal to or higher than Tg, the saddle-shaped composite article is restored to the memorized original shape.

As shown in FIG. 1, the branching pipe-connecting part 25 of the pipe joint 1 has preferably a diameter-enlarged part 27 at the end portion thereof into which a branching pipe 13 is inserted. The diameter-enlarged portion 27 has memorized an original cylindrical shape having an inner diameter equal to or smaller than the outer diameter of the branching pipe 13. To memorize the original shape, a cylindrical part having a uniform diameter over the entire length is first molded by a reaction molding, and thereafter, the end portion thereof is enlarged so that the diameter becomes larger than the outer diameter of the branching pipe 13 at an elevated temperature equal to or higher than the glass transition temperature (Tg) and then the cylindrical part 25 having the diameter-enlarged end portion 27 is cooled as it is. When the cylindrical part 25 is again heated to a temperature equal to or higher than the glass transition temperature (Tg) after the branching pipe 13 is inserted into the diameter-enlarged portion 27, the diameter-enlarged portion 27 is restored to the original dimension and firmly holds the branching pipe 13.

The plastic material used for the fusible plastic resin layers 29 and 31 is not particularly limited provided that it is capable of being fusion-bonded to plastic pipes 11 and 13 such as polyolefin pipes. Preferably, the plastic material is fusion-bondable to a shape-memorizable plastic resin when the shape-memorizable plastic material is made. When a polynorbornene is used as the shape-memorizable plastic resin, the plastic material used for the fusible plastic layers 29 and 31 can be selected form high-density polyethylene, medium-density, low-density polyethylene, polybutene-1, an ethylene-propylene copolymer, polypropylene, an ethylene-vinyl acetate copolymer (EVA), an ethylene-acrylic acid ester copolymer (EAA) and an ethylene-ethyl acrylate copolymer (EEA). These fusible plastic materials may be used either alone or in combination. If a fusible plastic material incapable of being bonded to the shape-memorizable plastic resin is used, an adhesive should be coated on the fusible plastic resin layers 29 and 31 so that the layers 29 and 31 adhere to the shape-memorizable plastic resin.

The construction of branching connections using the saddle type pipe joint 21 can be effected as follows. The saddle-shaped main part 23 of the pipe joint 21 is allowed to sit astride a main pipe 11, and heated to a temperature equal to or higher than the glass transition temperature (Tg) of the shape-memorized plastic resin. By this heating, the saddle-shaped main part 23 is restored to the original shape (illustrated by a broken line in FIG. 1) and the entire inner surface of the main part 23 is closely contacted with the outer periphery of the pipe 11, and simultaneously the fusible plastic resin layer 29 is fusion-bonded to the periphery of the pipe 11. Thus, the main part 23 firmly adheres to the pipe 11 and a watertight seal is formed between the main part 23 and the pipe 11.

Since the saddle-shaped main part 23 is closely contacted with the pipe 11 by the restoration to the original shape of the shape-memorized plastic resin layer, there is no need of using a special device or tool for fitting the saddle-shaped part 23 to the pipe 11. Further, since the shape-memorized plastic resin layer is formed by a reaction molding, this layer can have any desired thickness and thus the force of fitting the saddle-shaped part 23 to the main pipe 11 can be voluntarily adjusted.

A branching pipe 13 is inserted into the diameter-enlarged portion 27 of the pipe joint 21, and, when heated, the portion 27 firmly holds the branching pipe 13 by the restoration of the shape-memorized plastic resin 27 to the original shape, and simultaneously, the fusible plastic resin layer 31 is fusion-bonded to the branching pipe 13.

Figure 3:
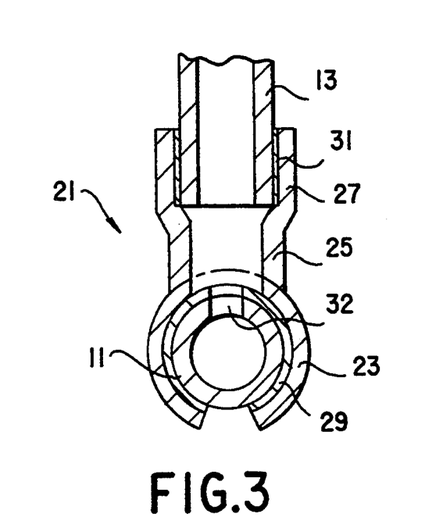
FIG. 3 is a front sectional view illustrating a state wherein a branched pipe is connected to a main pipe through the saddle type pipe joint of the invention.

Then a hole 32 is bored in the saddle-shaped main part 23 at the site within the cylindrical part 25 of the pipe joint 21, as illustrated in FIG. 3. This hole-boring is effected by inserting a hole-boring tool (not shown) through the cylindrical part 25. It is preferable that the boring is carried out while the inside of the cylindrical part 25 is subjected to air-suction so that chips do not intrude into the main pipe 11.

Then a branching pipe 13 is inserted into the diameter-enlarged portion 27 of the pipe joint 21, and, when heated, the portion 27 firmly holds the branching pipe 13 by the restoration of the shape-memorized plastic resin 27 to the original shape, and simultaneously, the fusible plastic resin layer 31 is fusion-bonded to the branching pipe 13. Thus, a strong and watertight branching connection is constructed.

Figure 4:
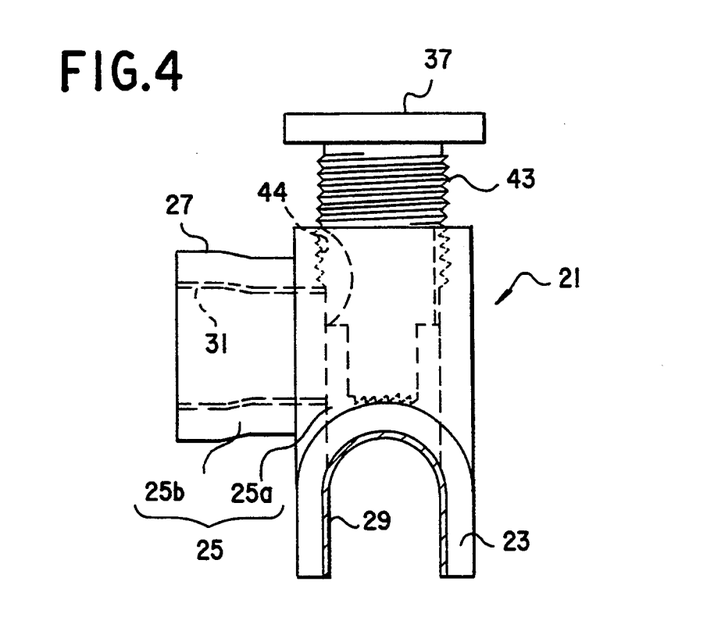
FIG. 4 is a partially cut-open front view of another saddle type pipe joint of the invention.

Another example of the saddle type pipe joint is illustrated in FIG. 4. This pipe joint 21 is suitable for constructing a branching connection while a liquid is allowed to flow through an installed main pipe. The saddle-shaped main part 23 of the pipe joint 21 is similar to that of the joint illustrated in FIG. 1, whereas the cylindrical branching pipe-connecting part 25 comprises a vertically extending cylindrical portion 25a directly connected to the main part 23 and a laterally extending cylindrical portion 25b connected to the vertical portion 25a. A hole-boring tool 37 with a screw 43 is screwed into the vertical portion 25a for boring a hole in the main part 23 and an installed main pipe (not shown). The saddle-shaped main part 23 and the lateral cylindrical portion 25b have fusible plastic resin layers 29 and 31, respectively, on the respective inner surfaces, which are similar to those of the pipe joint illustrated in FIG. 1. The end portion 27 of the lateral cylindrical portion 25a has an enlarged diameter which also is similar to the diameter-enlarged portion 27 illustrated in FIG. 1.

Figure 5:
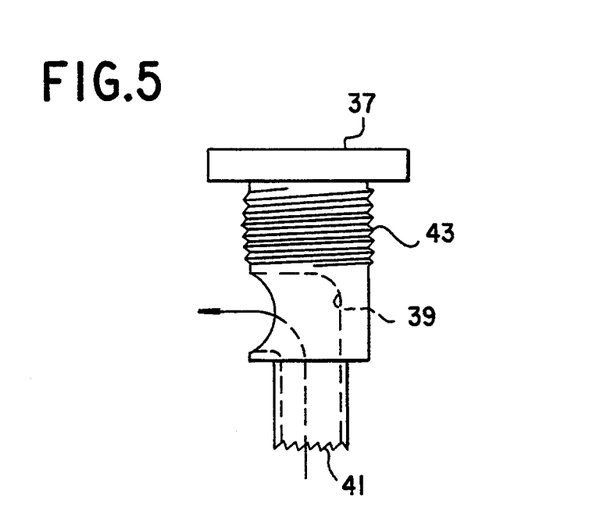
FIG. 5 is a front view of a hole-boring tool used for the sadle type pipe joint shown in FIG. 4.

The hole-boring tool 37 used in the saddle type pipe joint 21 of FIG. 4 is illustrated in FIG. 5. The hole-boring tool has a L-shaped passage 39 for a liquid flow shown by an arrow, and further has a notched cutting edge 41 at the lower end thereof for boring, and an outer male screw 43. The pipe joint 21 of FIG. 4 has a female screw 44, engaged with the male screw 43 of the tool 37, on the inner surface of the upper end portion of the vertical portion 25a.

Figure 6:
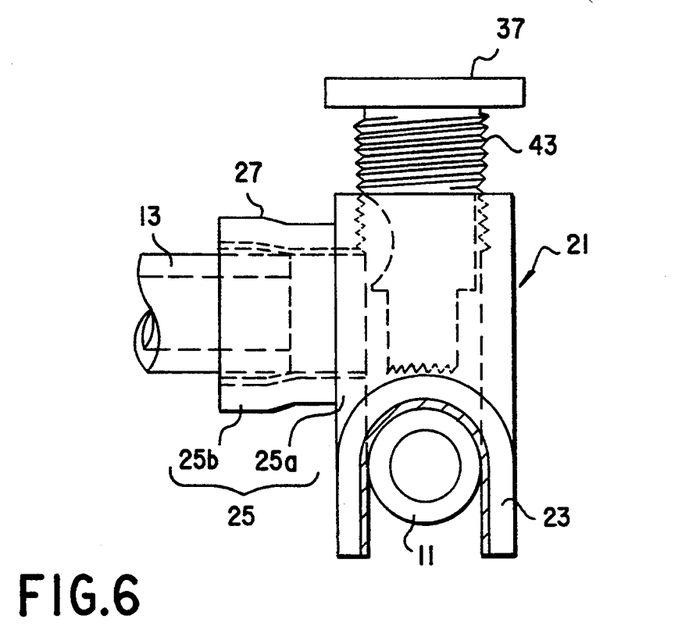
FIG. 6 is a front view illustrating the initial stage in the construction of branching connection using the saddle type pipe joint shown in FIG. 4.
Figure 7:
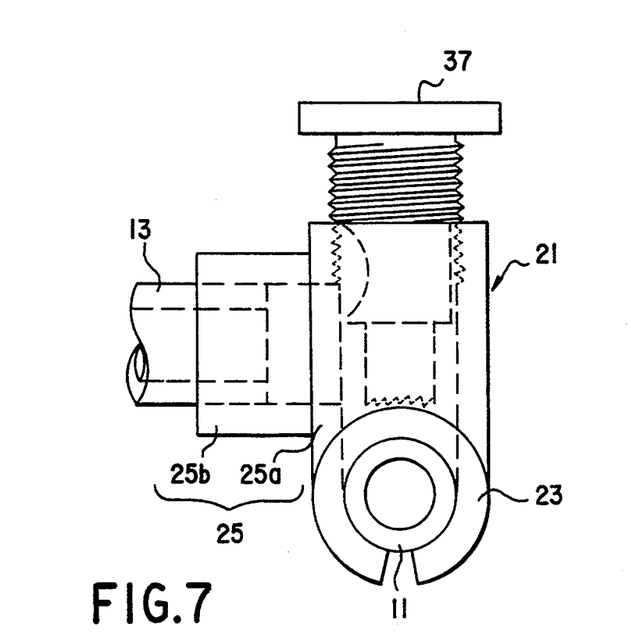
FIG. 7 is a front view illustrating the intermediate stage in the construction of branching connection using the saddle type pipe joint shown in FIG. 4.
Figure 8:
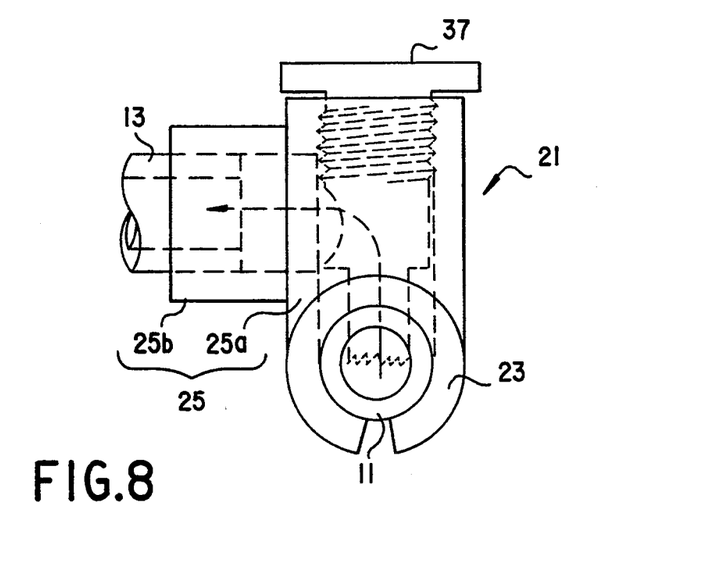
FIG. 8 is a front view illustrating the final stage in the construction of branching connection using the saddle type pipe joint shown in FIG. 4.

The construction of a branching connection using the pipe joint 21 of FIG. 4 is carried out as follows. First, the saddle-shaped main portion 23 is allowed to sit astride a main pipe 11 as illustrated in FIG. 6, while a liquid flows through the main pipe 11. A branching pipe 13 is inserted into the diameter-enlarged portion 27 of the lateral portion 25b. Then the saddle-shaped main part 23 and the diameter-enlarged portion 27 are heated whereby the part 23 and the region 27 are restored to the respective memorized original shapes as illustrated in FIG. 7, and simultaneously, are fusion-bonded to the main pipe 11 and the branching pipe 13, respectively. Thereafter, a hole-boring tool 37 having a notched cutting edge 41 at the lower end is screwed into the vertical portion 25a as illustrated in FIG. 8 to bore a hole in the main pipe 11 whereby a liquid is allowed to flow from the main pipe 11 through the passage 39 of the hole-boring tool to the branching pipe 13 as illustrated by an arrow in FIG. 8. Chips produced by the boring are forced through the passage 39 of the tool into the branching pipe, from which they are discharged outside.

Figure 9:
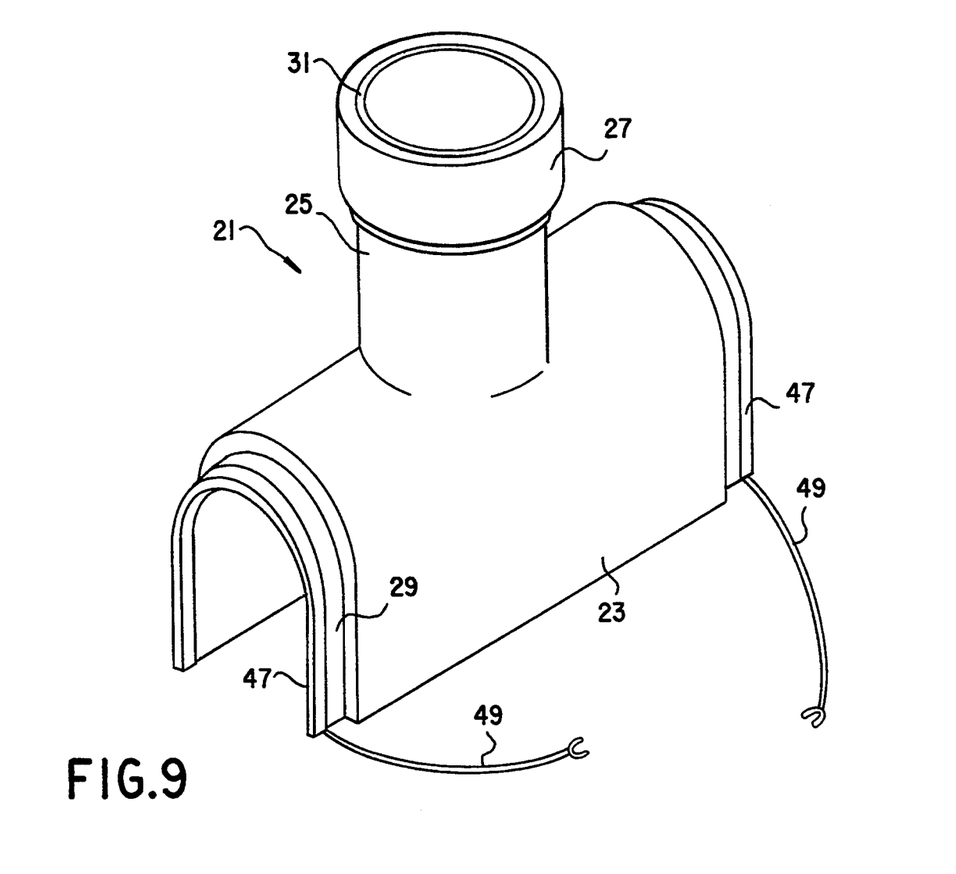
FIG. 9 is a perspective view of a further saddle type pipe joint of the invention.

FIG. 9 shows another example of the saddle type pipe joint 21 of the invention, wherein a saddle-shaped main part 23 has a fusible plastic resin layer 29 bonded on the inner surface of the part 23, which layer 29 is characterized as being electrically conductive. The electrically conductive fusible plastic resin layer 28 has electrodes 47 attached to both ends thereof and lead wires 49 attached to the electrodes. A hole has not been bored in the saddle-shaped main part 23 within a cylindrical branching pipe-connecting part 25 so that a hole is not bored in the fusible plastic resin layer 29 and thus the electrical resistance of the fusible plastic resin layer 29 is rendered uniform.

Figure 10:
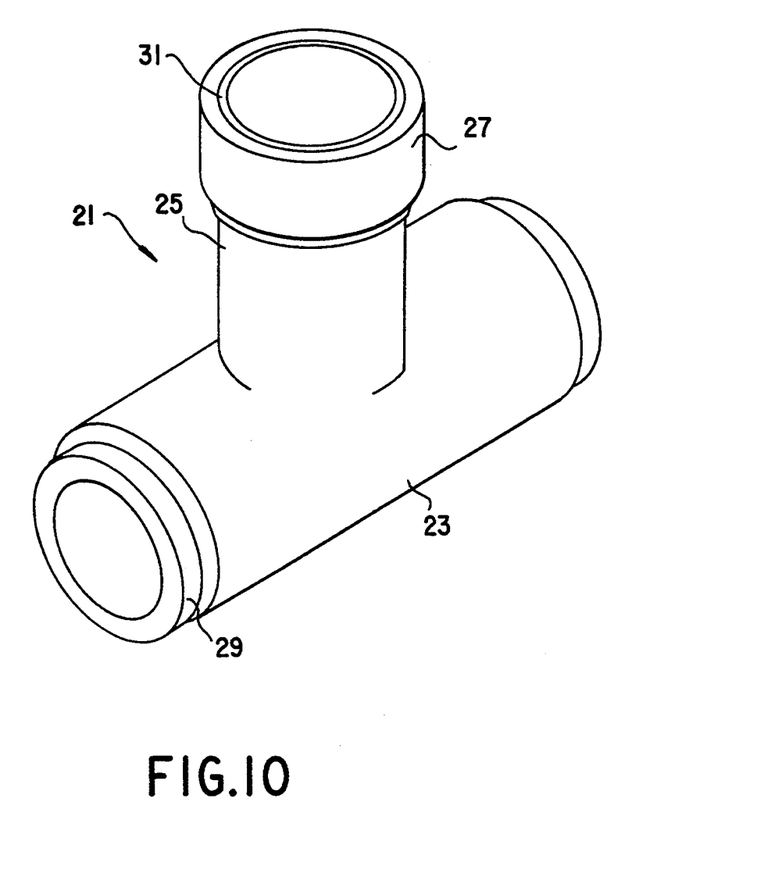
FIG. 10 is a perspective view of a composite article as molded in the process for making the saddle type pipe joint shown in FIG. 9.

FIG. 10 illustrates a composite article as molded from a reactive liquid stock for a shape-memorizable plastic resin. The main pipe body 23 of this composite article has not been subjected to cutting for forming a saddle-shaped part, but the end portion 27 of the branching pipe-connecting part has been enlarged in diameter.

The construction of a branching connection using the pipe joint 21 of FIG. 9 is carried out by allowing the saddle-shaped main part 23 to sit astride a main pipe and an electricity is applied to the conductive fusible plastic resin layer 29 whereby the part 23 is restored to the memorized original shape and simultaneously the fusible plastic resin layer 29 is fusion-bonded to the main pipe. Other constructions and operating procedures are similar to those of the pipe joint described with reference to FIG. 1.

In the above-described examples of the pipe joint of the invention, the branching pipe-connecting part 25 have a shape-memorized diameter-enlarged region 27 at an end portion thereof. However, as a modified embodiment, the shape-memorized end portion having a fusible plastic resin layer on the inner surface can be the same diameter as that of the other portions. In this embodiment, the clearance between the inner surface of the end portion and the outer surface of the branching pipe should be as small as possible.

The saddle type pipe joint of the invention has the following advantages.

The construction of branching connections using the saddle type pipe joint of the invention can be carried out without cutting a plastic main pipe. Therefore, when both a main pipe and branching pipes are newly constructed, operations can be conducted with an increased efficiency by using a main pipe of a continuous length. When branching pipes are newly connected to an installed main pipe, the construction can be carried out easily and while a liquid flows through the main pipe.

The saddle type pipe joint of the invention is composed of a shape-memorized plastic resin and the peripheral length of the saddle-shaped main part is larger than a half of the outer periphery of a main pipe. When used, the pipe joint firmly holds the main pipe in the state of closely contact with at least half of the periphery of the main pipe and by the force of restoring to the memeorized original shape. Therefore, the fusion-bonding of the pipe joint to the main pipe is strong and the branching connection has a high watertightness.

What is claimed is:

1. A saddle type pipe joint for construction of branching connections to connect a main pipe and a branching pipe, comprising:
  a saddle-shaped part composed of a shape-memorized plastic resin having a first memorized shape and a second shape different from said first memorized shape, and which can be fusion-bonded to the main pipe; said saddle-shaped part changing upon heating from said second shape to said first memorized shape; and
  a cylindrical part extending from said saddle-shaped part and having a longitudinal axis extending transversely to said saddle-shaped part, wherein said cylindrical part can be connected to the branching pipe, wherein said saddle-shaped part and said cylindrical branching pipe-connecting part are integrally molded together; in use, said saddle-shaped part fitting over the main pipe and having an interior peripheral length which is greater than a half of an outer peripheral length of the main pipe; said first memorized shape being such that, upon changing from said second shape to said first memorized shape, said saddle-shaped part tightly holds the main pipe by closely contacting more than a half of the outer periphery of the main pipe; said saddle-shaped part having on the inside thereof a fusion-bonding plastic resin layer which will fuse and bond to the main pipe at a temperature at which said saddle-shaped part is restored to said first memorized shape, said fusion-bonding plastic layer comprising a fusible plastic resin layer having incorporated therein an electrically conductive filler.

2. A saddle type pipe joint according to claim 1, wherein said cylindrical branching pipe-connecting part has one end which has an enlarged diameter so that a branching pipe can be inserted therein, and wherein said end portion has memorized therein a cylindrical shape having a diameter no greater than an outer diameter of the branching pipe; and said diameter-enlarged end portion having an internal surface having an integrally formed fusible plastic resin layer which is fusion-bonded to the outer surface of the branching pipe at a temperature at which said diameter-enlarged end portion is restored to the memorized original shape.

3. A saddle type pipe joint according to claim 2, wherein said fusible plastic resin layer contains an electrically conductive filler.

4. A saddle type pipe joint according to claim 1, wherein said shape-memorized plastic resin is comprised of a thermosetting polynorbornene resin.

5. A saddle type pipe joint for construction of branching connections to connect a main pipe and a branching pipe, comprising:

a saddle-shaped part composed of a shape-memorized plastic resin having a first memorized shape and a second shape different from said first memorized shape, and which can be fusion-bonded to the main pipe; said saddle-shaped part changing upon heating from said second shape to said first memorized shape; and a cylindrical part extending from said saddle-shaped part and having a longitudinal axis extending transversely to said saddle-shaped part, wherein said cylindrical part can be connected to the branching pipe, wherein said saddle-shaped part and said cylindrical branching pipe-connecting part are integrally molded together; in use, said saddle-shaped part fitting over the main pipe and having an interior peripheral length which is greater than a half of an outer peripheral length of the main pipe; said first memorized shape being such that, upon changing from said second shape to said first memorized shape, said saddle-shaped part tightly holds the main pipe by closely contacting more than a half of the outer periphery of the main pipe; said saddle-shaped part having on the inside thereof a fusion-bonding plastic resin layer which will fuse and bond to the main pipe at a temperature at which said saddle-shaped part is restored to said first memorized shape, said fusion-bonding plastic layer comprising a fusible plastic resin layer comprising a laminate of a fusible plastic resin layer, and a fusible plastic resin layer having incorporated therein an electrically conductive filler.

6. A saddle type pipe joint according to claim 5, wherein said cylindrical branching pipe-connecting part has one end which has an enlarged diameter so that a branching pipe can be inserted therein, and wherein said end portion has memorized therein a cylindrical shape having a diameter no greater than an outer diameter of the branching pipe; and said diameter-enlarged end portion having an internal surface having an integrally formed fusible plastic resin layer which is fusion-bonded to the outer surface of the branching pipe at a temperature at which said diameter-enlarged end portion is restored to the memorized original shape.

7. A saddle type pipe joint according to claim 6, wherein said fusible plastic resin layer, in said diameter enlarged end portion contains an electrically conductive filler.

8. A saddle type pipe joint according to claim 5, wherein said shape-memorized plastic resin is comprised of a thermosetting polynorbornene resin.

* * * * *